US007512180B2

(12) United States Patent
Florencio

(10) Patent No.: US 7,512,180 B2
(45) Date of Patent: Mar. 31, 2009

(54) HIERARCHICAL DATA COMPRESSION SYSTEM AND METHOD FOR CODING VIDEO DATA

(75) Inventor: Dinei A. F. Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 10/606,062

(22) Filed: Jun. 25, 2003

(65) Prior Publication Data

US 2004/0264568 A1  Dec. 30, 2004

(51) Int. Cl.
H04N 7/12 (2006.01)
H04N 11/02 (2006.01)
H04N 11/04 (2006.01)
H04B 1/66 (2006.01)

(52) U.S. Cl. .................................. 375/240.12
(58) Field of Classification Search ................ None
See application file for complete search history.

(56) References Cited

U.S. PATENT DOCUMENTS

| | | | | |
|---|---|---|---|---|
| 4,306,223 A | * | 12/1981 | Weber | 341/138 |
| 5,253,058 A | * | 10/1993 | Gharavi | 375/240.12 |
| 6,643,332 B1 | * | 11/2003 | Morelos-Zaragoza et al. | 375/265 |
| 6,714,594 B2 | * | 3/2004 | Dimitrova et al. | 375/240.16 |
| 6,917,711 B1 | * | 7/2005 | Wang et al. | 382/232 |
| 2004/0196902 A1 | * | 10/2004 | Faroudja | 375/240.1 |

OTHER PUBLICATIONS

Al-Regib, G. and Altunbasak, Y., "Hierarchical motion estimation with content-based meshes" *to appear in IEEE Trans. on Circuits and Systems for Video Technology* in Oct. 2003.
Andersson, K. and Knutsson, H., "Multiple hierarchical motion estimation", in *Proceedings of Signal Processing, Pattern Recognition, and Applications (SPPRA'02)*, pp. 80-85, Crete, Greece, Jun. 2002.
Cheung, C.K. and Po, L.M., "A hierarchical block matching algorithm using partial distortion measure" in *Proceedings of IEEE International Symposium on circuits and systems*, vol. II, pp. 1237-1240, Jun. 1997.
Houlding, D. and Vaisey, J., "Pyramid decompositions and hierarchical motion compensation", in *Digital Video Compression: Algorithms and Technologies*, vol. 2419 of *Proc. of SPIE*, pp. 201-209, Feb. 7-10, 1995.

(Continued)

*Primary Examiner*—Nhon T Diep
(74) *Attorney, Agent, or Firm*—Lyon & Harr, L.L.P.; Craig S. Fischer

(57) ABSTRACT

A hierarchical data compression system and method for encoding and decoding video data by dividing each video frame of the video data into independent layers. Each of the layers contains a specific frequency band that is less than the entire frequency spectrum contained in the video frame. This impendency allows each layer to be encoded and decoded independently of other layers. Because each layer contains a specific frequency band, any unwanted and extraneous frequencies that arise during encoding that are not present in the original source are automatically removed. In general, the hierarchical data compression method divides video frames into layers, with each layer containing a specific frequency band. The layers then are encoded. Later, the layers are decoded to recover the video frames. The hierarchal data compression system includes a hierarchical encoder and decoder for facilitating independent encoding and decoding of each layer of the divided video frames.

17 Claims, 12 Drawing Sheets

OTHER PUBLICATIONS

Illgner, K. and Muller, F., "Hierarchical coding of motion vector fields", in *Proc. of IEEE International Conference on Image Processing*, vol. 1, pp. 566-569, Oct. 1995.

Lin, C-W, Chang, Y-J, and Chen, Y-C, "Hierarchical motion estimation algorithm based on pyramidal successive elimination", in *Proc. Int. Computer Symp.*, pp. 41-44, Dec. 17-19, 1998, Tainan, Taiwan.

Memin, E. and Perez, P., "A multigrid approach for hierarchical motion estimation", in *IEEE Proceedings of the Sixth International Conference on Computer Vision*, pp. 933-938, Bombay, India, Jan. 1998.

Skrzypkowiak, S.S. and Jain, V.K., "Hierarchical video motion estimation using a neural network", in *Workshop on Digital and Computational Video 2001*, pp. 202-208.

* cited by examiner

HIERARCHICAL DATA COMPRESSION SYSTEM AND METHOD FOR CODING VIDEO DATA

TECHNICAL FIELD

The present invention relates in general to data compression and more particularly to a hierarchical data compression system and method for encoding and decoding video data by dividing the video data into layers whereby each layer is encoded and decoded independently of other layers.

BACKGROUND OF THE INVENTION

Data compression is widely used and vital to the high-speed and efficient exchange and storage of data. One of the goals of data compression is to compress original data as much as possible, transmit or store the compressed data, and then uncompress the compressed data to reconstruct the original data. Better compression means that, at a given signal to noise ratio, the compressed data are smaller and thus use fewer bits of information to represent the original data. Using fewer bits of information both reduces the time required to transmit the compressed data and the amount of storage space needed to store the compressed data. This can significantly shorten the download time of compressed data (such as from the Internet) and can save precious space on storage media (such as a hard disk). This results in a savings of both time and expense.

Current data compression techniques for video data take advantage of the fact that much of the material in video frames is redundant. Traditional motion compensation techniques used to compress video data (such as those used in H.261 to H.264 and MPEG) are generally block-based. On the encoder side, block-based motion compensation techniques use a current frame and a reference frame. The current frame is divided into blocks. For each block, the reference frame is searched to find a similar block that provides the best match. The matching block in the reference frame is subtracted from the block in the current frame to provide a difference. This difference (also called "motion compensated frame difference") is encoded along with the motion vectors that indicate the position of the block in the current frame. The decoder can recover the current frame using the reference frame and the encoded difference. These block-based motion compensation techniques require that both the encoder and decoder have a reference frame. This means that the reference frame must be received completely by the decoder before the current frame can be decoded.

Current block-based motion compensation techniques typically have discontinuities in the boundaries between a block in the current frame and a matching block in the reference frames. These discontinuities, often called blocking artifacts, add unwanted high frequencies that are encoded along with the difference and the motion vectors. In general, high frequencies are present in video containing a large amount of details, edges, sharp contrasts and discontinuities. On the other hand, low frequencies are present in video containing smooth transitions between, pixel intensity and less detail.

Blocking artifacts are a problem in traditional coding techniques for several reasons. First, the blocking artifacts are visible in the decoded video and greatly diminish the quality of the video. Second, as mentioned above, the blocking artifacts contain many high frequencies that must be encoded by the encoder. However, as is known in the art, coding high frequencies generally is more expensive that coding low frequencies. Third, the high frequencies present in the encoded data were created by the block based motion compensation technique. These high frequencies were not present in the reference frame or the current frame but were added without approval. These factors show that blocking artifacts greatly increase the expense of encoding and add undesirable high frequencies to the encoded data.

The traditional solution for blocking artifacts is to use a deblocking filter. Many of the standards listed above use deblocking feature. In general, the deblocking filter attenuates high frequencies present in the decoded data. The deblocking filter however, merely aids the high-frequency addition problem but does not solve it. In other words, the encoded data still has unwanted high frequencies that are added. Moreover, another problem is that the deblocking filter frequently indiscriminately removes all high frequencies, both unwanted and those high frequencies that are part of the data. Thus, the deblocking filter frequently attenuates the wrong frequencies. Therefore, there exists a need for a hierarchical data compression system and method that does not add unwanted frequencies during the coding process and eliminate block artifacts to produce higher-quality compression of video data.

SUMMARY OF THE INVENTION

Hierarchical video data compression (or hierarchical video coding) is desirable because it has an important role in facilitating the transmission of video data over variable bit rate channels. In situations where a long delay is not allowed for buffering during transmission, hierarchical video coding may be the only option. However, traditional video coding techniques do not lend themselves to hierarchical video coding. For example, motion compensation techniques typically are block-based and require a complete reference frame for coding the video data. In addition, block boundaries often will present sharp discontinuities that result in high frequencies being added to that encoded video data that were not present in the original source and do not belong. This results in visible block artifacts that adversely affect the quality of the video being viewed.

Although hierarchical video coding technique do exists, they tend to follow the same approach used in image coding, with little success. Specifically, current hierarchical video coding techniques divide a video frame into layers, with each layer containing the full spectrum of frequency bands for that video frame. Thus, a current layer depends on previous layers for encoding and decoding of the current layer. This technique can prove to be a problem if data is not received during transmission from the encoder to the decoder. Moreover, this implies a reduction in the compression efficiency, as the higher layers contain refinement of the same information, and would be helpful in predicting lower layers.

The hierarchical data compression system and method disclosed herein provides hierarchical data compression of video data that is truly independent. Each video frame of the video data is divided into layers. Each layer contains a specific frequency band (or range) that is less than the full spectrum of frequencies available for the video frame. This means that the layers can be processed independent of each other. In other words, a layer can be encoded and decoded completely independent of the other layers. Each frequency band represents a different resolution level of the video data. Moreover, because each layer contains a specific frequency band, any unwanted and extraneous frequencies (such as high frequencies added by block artifacts) not present in the original source are automatically removed. This produces decoded video data having a much higher quality and fidelity to the original video data.

The hierarchical data compression method divides a video frame into a plurality of layers that represents a particular level of resolution. Moreover, each layer contains a unique frequency band containing a range of frequencies. Each of the layers, when taken together, provides the full resolution of the video frame. Each of the layers can be encoded and decoded independently of each other. Moreover, a layer can be encoded and decoded using elements (such as reference, predicted and current frames) at the same layer as the layer being processed or at a lower layer. Thus, a current layer can be processed using a layer of equal or lower resolution and frequency band. When motion compensation is used for coding, each predicted sub-frame can be obtained from reference frame and current frames at the same or lower layer. After prediction, each of the predicted sub-frames is filtered to remove any frequencies outside the frequency band for that layer. This restricts the frequency band in the predicted sub-frame to the original frequency band in the reference sub-frame for that layer. Ideally, frequency bands are oversampled to reduce spatial aliasing effects.

The hierarchical data compression system uses the hierarchical data compression method and includes a hierarchical encoder and a hierarchical decoder. In general, the hierarchical encoder encodes video data into encoded layers with each layer having a specific frequency band. These encoded layers then are later decoded by the hierarchical decoder to recover the original video data. The decoding of each layer occurs independently of the other layers. The hierarchical encoder includes a hierarchical reference frame processing module that acquires a reference frame and divides the reference frame into a plurality of reference sub-frames. The hierarchical encoder also includes a hierarchical prediction frame processing module that generates initial prediction sub-frames. In addition, the hierarchical prediction frame processing module further processes the initial prediction sub-frames to produce modified prediction sub-frames using filters to filter out frequencies outside of the frequency band of the sub-frame.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The hierarchical data compression system and method processes video data in order to reduce the number of bits needed to represent the video data. Traditional data compression approaches (such as those using block-based motion compensation) typically require a reference frame to be received completely prior to encoding or decoding the video data. This severely limits the flexibility and reduces the speed and efficacy of the data compression. Moreover, block-based motion compensation techniques produce unwanted discontinuities at block boundaries, introducing high frequencies into the encoded data that was not present in the original source. These discontinuities cause blocking artifacts, a phenomenon that is well known in the art and is visible in the viewed video data.

The hierarchical data compression system and method subdivides each frame of video data into a plurality of layers that can be encoded and decoded independently. Rather than each layer containing a full spectrum of frequency bands contained in the video frame, each layer of the hierarchical data compression system and method contains a specific frequency band (or range). Each frequency band represents a different resolution level of the video frame. For example, a low-frequency layer (or low-resolution layer) contains only low frequencies of the video frame, and a high-frequency layer (an enhanced resolution layer) contains only high frequencies of the video frame. This provides the advantages of hierarchical data compression while keeping the compression efficiency loss to a minimum. Moreover, because it is known which frequencies belong in a layer, any unwanted frequencies are automatically removed before encoding. For example, any high frequencies caused by blocking artifacts that were introduced into a low-frequency layer would be filtered out, because it is known that only low frequencies are contained in the low-frequency layer. This greatly improves the quality of the decoded video data and effectively eliminates blocking artifacts. The hierarchical data compression system and method also utilizes frequency band properties and groupings of frequency bands to improve filtering characteristics.

II. General Overview

Figure 1:
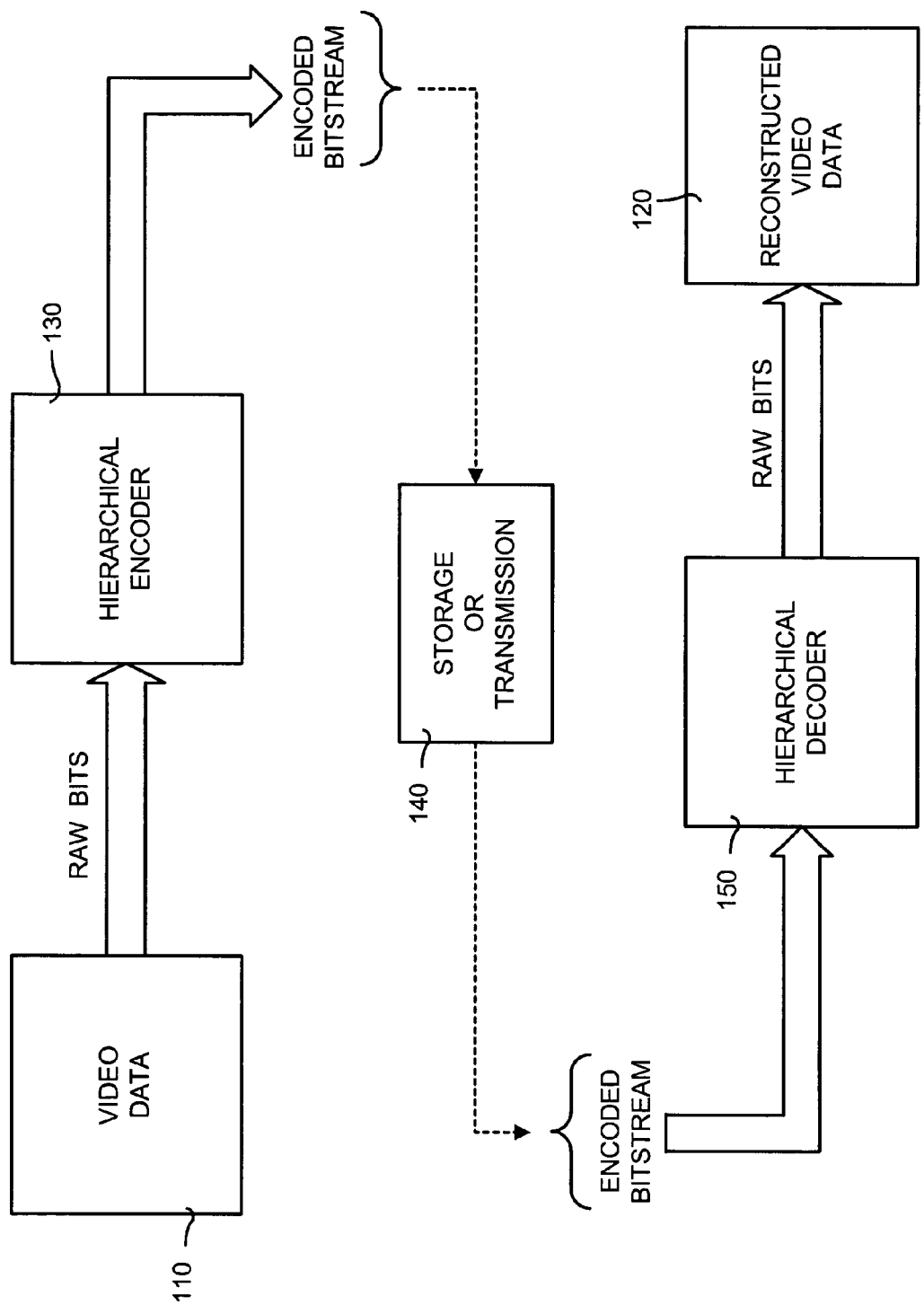
FIG. 1 is an overall block/flow diagram illustrating a general overview of hierarchal data compression system and method disclosed herein.

FIG. 1 is an overall block/flow diagram illustrating a general overview of hierarchal data compression system and method disclosed herein. In general, the system 100 inputs video data 110 encodes the video data 110, and later decodes the encoded video data 110 to recover reconstructed video data 120. In particular, the hierarchical data compression system 100 begins by inputting raw bits of the video data 110 into a hierarchical encoder 130. In accordance with the invention set forth herein, the hierarchical encoder 130 processes the raw bits and encodes the video data 110 into an encoded bitstream. The encoded bitstream may be utilized, stored or transmitted 140. By way of example, this transmission may be over a variable bit rate channel.

When it is desired to decode the encoded bitstream and recover the video data, the encoded bitstream is received by a hierarchical decoder 150. In accordance with the invention set forth herein, the hierarchical decoder 150 processes the encoded bitstream to reconstruct the original video data 110. Raw bits are output from the hierarchical decoder 150 and the reconstructed video data 120 is produced. Ideally, the reconstructed video data 120 substantially matches the original video data 110.

The video data 110 can be color or black and white. As generally is done in the literature, it will be assumed that a color video has been converted to appropriate color space (such as, for example, YUV), with some components possibly downsampled (such as in a 4:2:0 sampling scheme). A person skilled in the art will be highly familiar with these terms. In the following description, encoding and decoding of a single component (such as a Y component) is described. It should be understood that other components would be treated similarly, either independently from each other or sharing some information (such as motion vectors).

III. Exemplary Operating Environment

The hierarchical data compression system and method disclosed herein is designed to operate in a computing environment. The following discussion is intended to provide a brief, general description of a suitable computing environment in which the hierarchical data compression system and method may be implemented.

Figure 2:
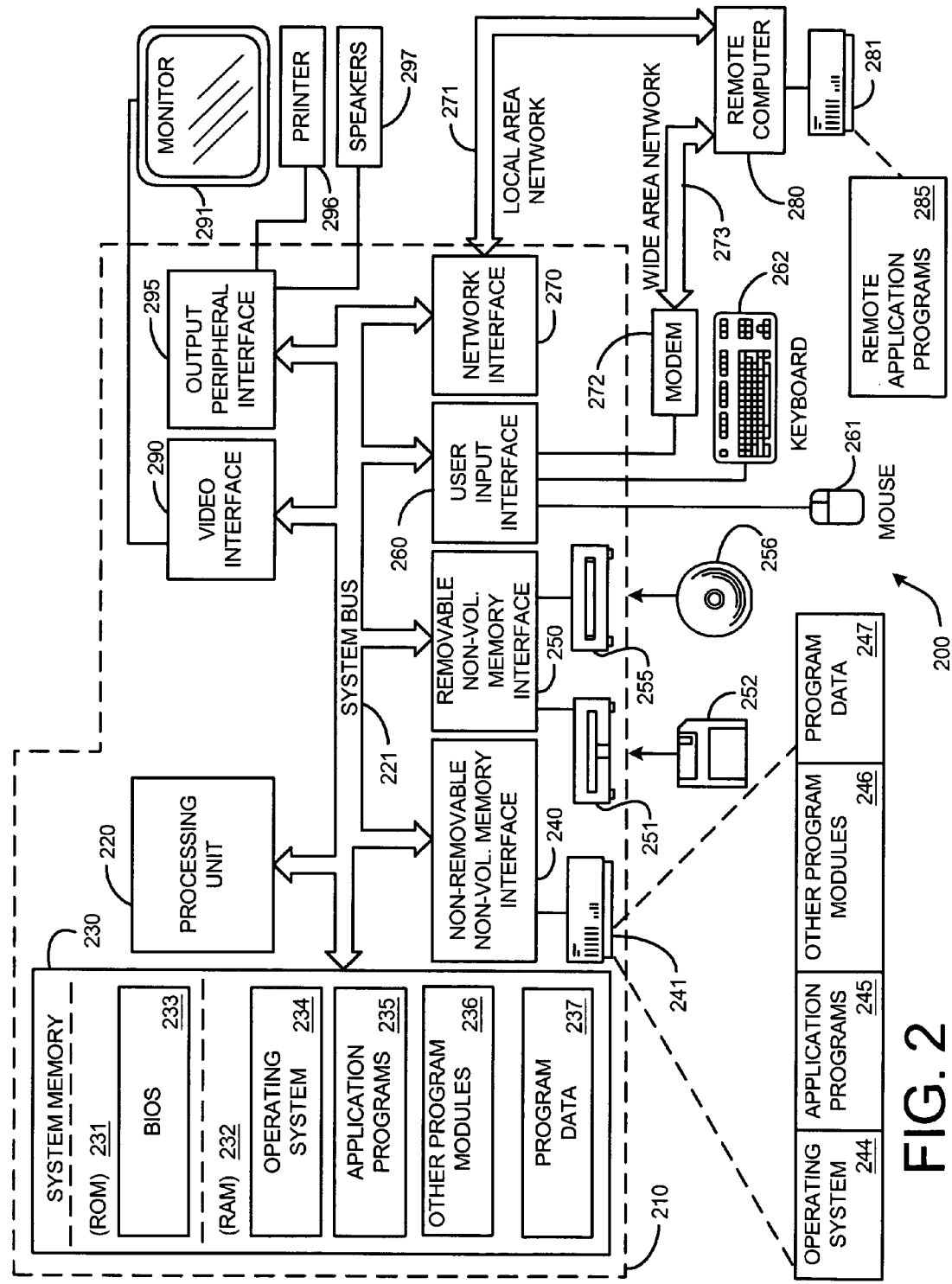
FIG. 2 illustrates an example of a suitable computing system environment in which the hierarchical data compression system and method shown in FIG. 1 may be implemented.

FIG. 2 illustrates an example of a suitable computing system environment 200 in which the hierarchical data compression system and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The hierarchical data compression system and method is operational with numerous other general purpose or special purpose computing system environments or configurations. Examples of well known computing systems, environments, and/or configurations that may be suitable for use with the hierarchical data compression system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The hierarchical data compression system and method may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the hierarchical data compression system and method includes a general-purpose computing device in the form of a computer 210.

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. Hierarchical Data Compression System and Components

As described in general above, the hierarchical data compression system 100 shown in FIG. 1 contains a hierarchical encoder 130 and a hierarchical decoder 150. In general, the hierarchical encoder 130 encodes video data into layers with each layer having a specific frequency band. These encoded layers then are later decoded by the hierarchical decoder 150 to recover the original video data. The decoding of each layer occurs independently of the other layers. The components of the hierarchical encoder 130 and the hierarchical decoder 150 will now be discussed in detail.

Figure 3:
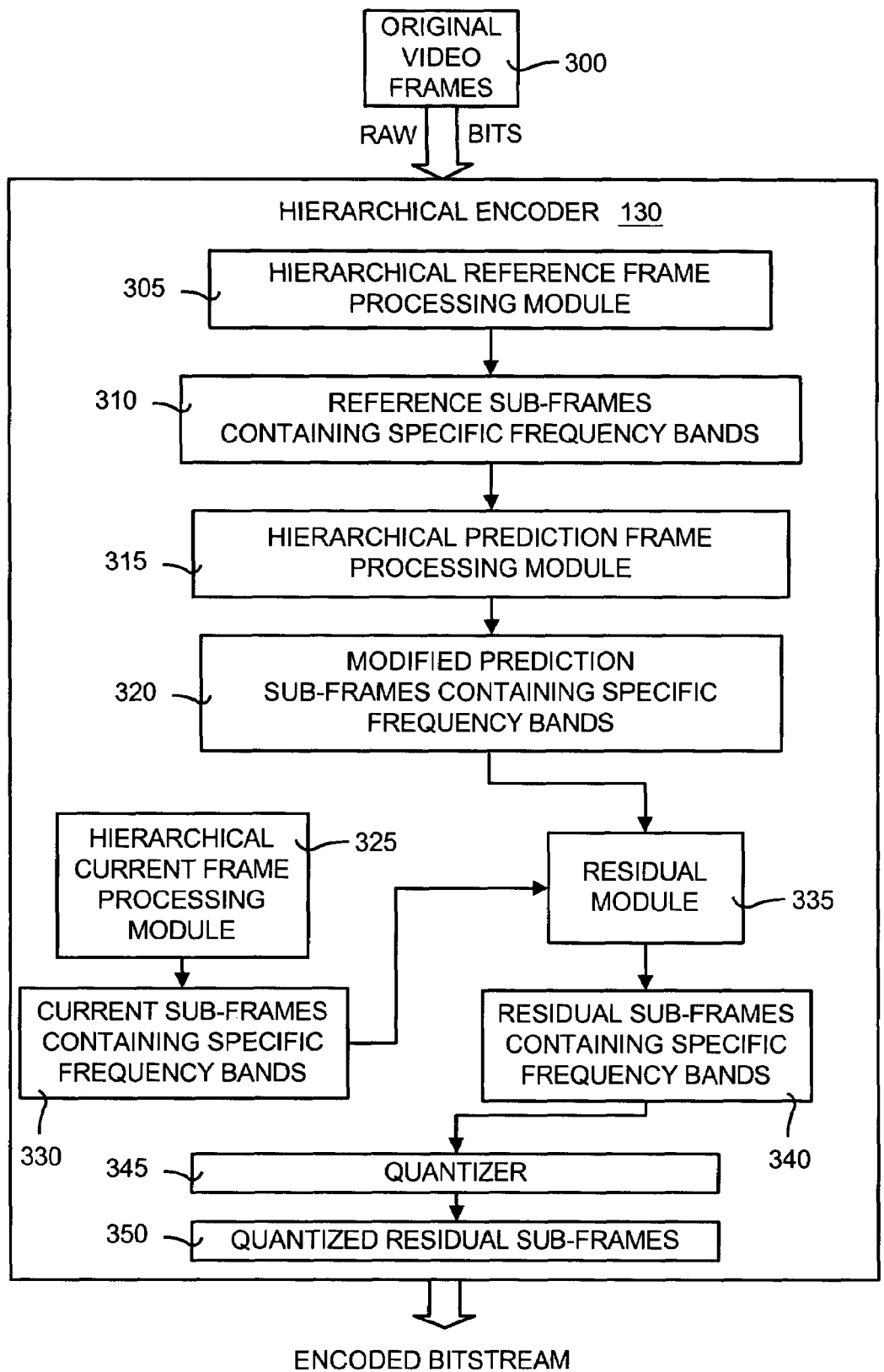
FIG. 3 is a block diagram illustrating the components of the hierarchical encoder shown in FIG. 1.

FIG. 3 is a block diagram illustrating the components of the hierarchical encoder 130 shown in FIG. 1. Generally, the hierarchical encoder 130 inputs original video frames 300, processes these frames 300, and outputs an encoded representation of these video frames 300. In particular, raw bits of the original video frames 300 are input to the hierarchical encoder 130. A hierarchical reference frame processing module 305 acquires a reference frame. As commonly known to those having ordinary skill in the art, this reference frame may be produced by the same decoding process that will happen at the decoder. This guarantees that encoder and decoder will use the same reference frame. The reference frame processing module 305 then divides the reference frame into a plurality of reference sub-frames 310. It should be noted that a sub-frame can also be referred to as a layer. Each of the plurality of reference sub-frames containing a specific frequency band, such as, for example, a low-frequency band. The reference sub-frames are used by a hierarchical prediction frame processing module 315 to generate initial prediction sub-frames. Moreover, the hierarchical prediction frame processing module 315 further processes the initial prediction sub-frames to produce modified prediction sub-frames 320. As before, these modified prediction sub-frames 320 contain specific frequency bands as opposed to an entire spectrum of frequencies contained in the video frame.

A hierarchical current frame processing module 325 obtains a current frame and processes the current frame to generate current sub-frames containing specific frequency bands 330. The current sub-frames 330 and the modified prediction sub-frames 320 are input to a residual module 335. The residual module 335 takes the difference between each of the current sub-frames 330 and the modified prediction sub-frames 320 to generate residual sub-frames 340. Each of the residual sub-frames 340 contains specific frequency bands. The residual sub-frames 340 are processed by a quantizer 345 to create quantized residual sub-frames 350. These quantized residual sub-frames 350 are output from the hierarchical encoder 130 and transmitted or stored as an encoded bitstream. It should also be noted that other information may be required to be stored or transmitted along with the residual subframes 350. This may include motion vectors, quantization steps, and other information, generally referred to as "side information". Furthermore, the data may be encoded by an "entropy coder" in order to reduce the number of bits needed to represent the information.

Figure 4:
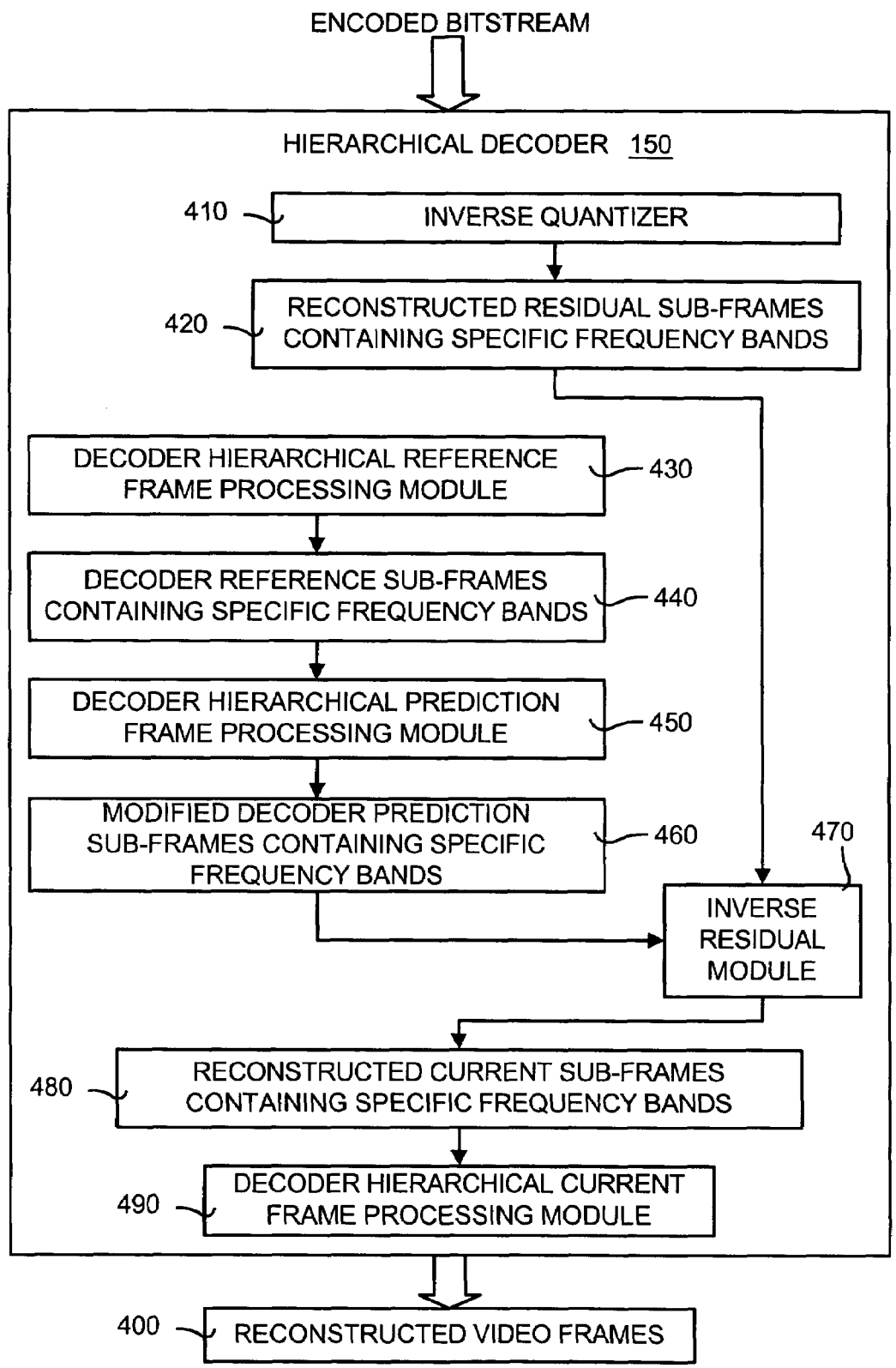
FIG. 4 is a block diagram illustrating the components of the hierarchical decoder shown in FIG. 1.

FIG. 4 is a block diagram illustrating the components of the hierarchical decoder shown in FIG. 1. In general, the hierarchical decoder 150 inputs the encoded bitstream, processes the data encoded therein, and outputs reconstructed video frames 400. Specifically, the encoded bitstream is received by the hierarchical decoder 150 and is processed to separate the side information (such as motion vectors) and the residual information. The residual information then is processed by an inverse quantizer 410. The inverse quantizer 410 outputs reconstructed residual sub-frames containing specific frequency bands 420. The reconstructed residual sub-frames 420 correspond to an approximation of the residual sub-frames 340 in the hierarchical encoder 130.

Meanwhile, a decoder version of the hierarchical reference frame processing module 430 inputs a reference frame. The decoder hierarchical reference frame processing module 430 processes the reference frame into decoder reference sub-frames 440, with each sub-frame containing a specific frequency band. Using the decoder reference sub-frames 440, and possibly the motion vectors transmitted for the current frame, a decoder hierarchical prediction frame processing module 450 generates modified decoder prediction sub-frames 460 that contain specific frequency bands. Note that, apart from possible bit-errors in the channel, the prediction sub-frames 460 should be the same as the modified prediction sub-frames 320 (the sub-frames produced by the hierarchical encoder 130).

The modified decoder prediction sub-frames 460 and the reconstructed residual sub-frames 420 are input to an inverse residual module 470. The inverse residual module 470 adds the modified decoder prediction sub-frames 460 and the reconstructed residual sub-frames 420 to obtain reconstructed current sub-frames 480. These reconstructed current sub-frames 480 are processed by a decoder hierarchical current frame processing module 490 to obtain the entire reconstructed video frames 400. The reconstructed video frames 400 correspond to the original video frames 300 encoded by the hierarchical encoder 130.

V. Operational Overview

The hierarchical data compression system and method disclosed herein generate independent layers. These independent layers do not depend on each other for encoding or decoding. This is because the full frequency spectrum is not sent with each layer. Rather, each layer contains a specific band of frequencies (such as a low frequency band). Furthermore, it should be noted that these layers are essentially independent because translational motion does not change these frequency components. Only a small amount of dependency is introduced by aliasing, and more complex motion (such as zooming, rotation, and so forth).

Some current video compression techniques use hierarchical coding. In these hierarchical coders, a video frame from video data is encoded in layers and these layers are sent to the decoder. The decoder decodes each layer one at a time. As each layer decoded, the resolution of the frame improves. Each layer, however, includes all the frequencies of the video frame. In other words, the full frequency spectrum of the video frame, including the low, mid and high frequencies, is contained in each layer. Because of this, each layer depends on the other layers. Thus, in order to decode a current layer the previous layers received must first be decoded.

The hierarchical data compression method divides a video frame into a plurality of layers. Each layer contains a unique frequency band containing a range of frequencies. Each layer, along with its corresponding frequency band, represents a particular level of resolution. For example, low frequencies typically are associated with low resolution and less detail, while higher frequencies typically are associated with high resolution and greater detail.

Figure 5:
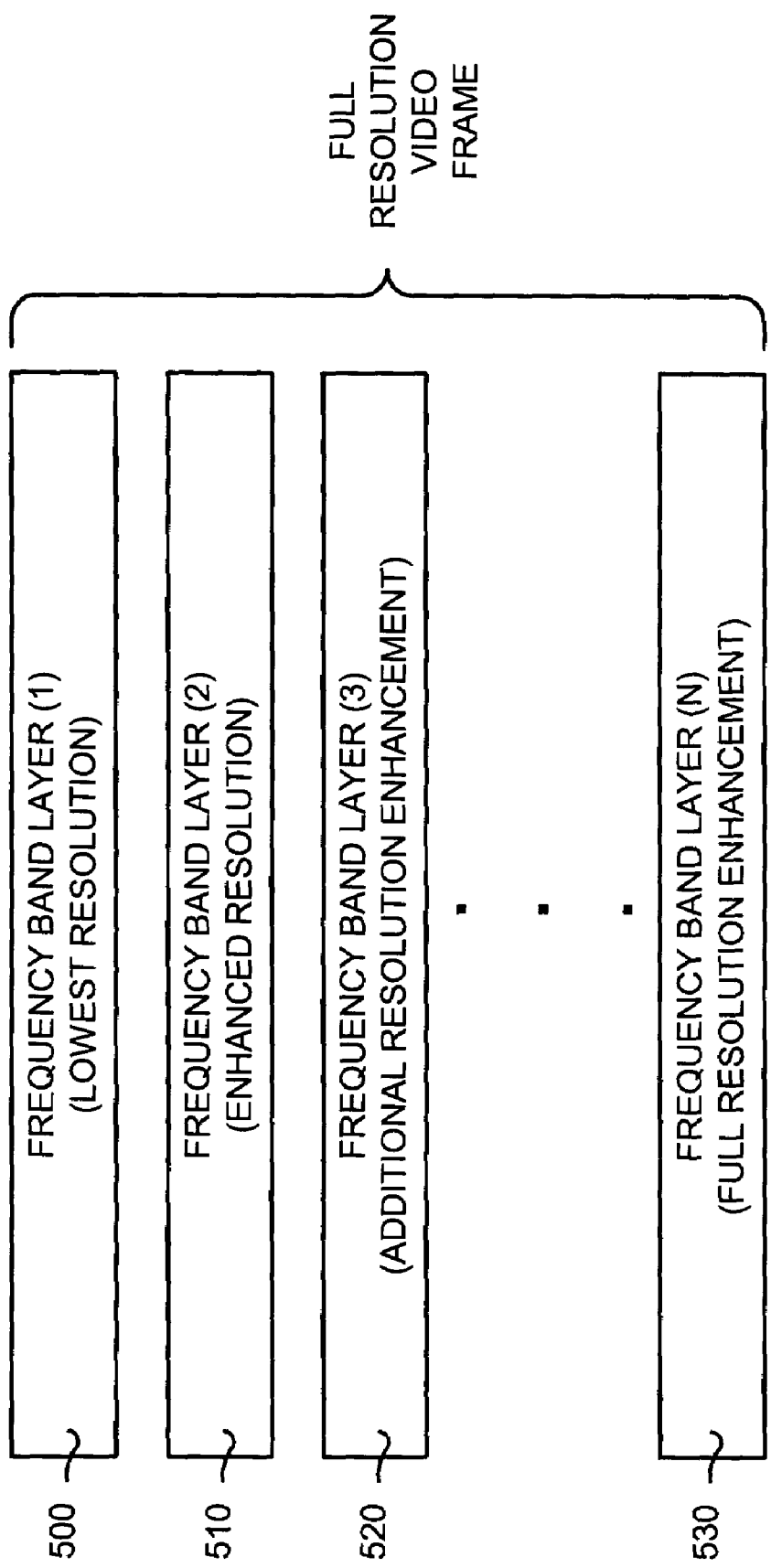
FIG. 5 is block diagram illustrating a general overview of the layering process of the hierarchical data compression method.

FIG. 5 is block diagram illustrating a general overview of the layering process of the hierarchical data compression system and method. The video frame is divided into layer from layer (1) to layer (N). In particular, frequency band layer (1) 500 represents the lower layer, and is the layer having the lowest resolution. The next layer is frequency band layer (2) 510, which contains a frequency band having higher frequencies than that of frequency band layer (1) 500. In addition, frequency band layer (2) 510 contains enhanced resolution of a higher resolution than frequency band layer (1) 500. Frequency band layer (3) 520 contains a frequency band having higher frequencies than that of frequency band layer (2) 510 and frequency band layer (1) 500. In addition, frequency band layer (3) 520 has a higher resolution than the two lower layers. At the highest layer is frequency band layer (N) 530. Frequency band layer (N) 530 contains a frequency band having higher frequencies than the rest of the layers and has the highest resolution of any of the other layers.

In an alternated embodiment, the layers may include different directions. One alternate embodiment considers each of the bands in a dyadic wavelet decomposition as one layer. For example, the signal may be split into layers LL, LH, HL, and HH, corresponding to the traditional bands in wavelet processing (in other words, low frequencies, horizontal, vertical, and diagonal). Each of the layers, when taken together, provides the full resolution of the video frame.

Each of the layers can be encoded and decoded independently of each other. Moreover, a layer can be encoded and decoded using elements (such as reference, predicted and current frames) at the same layer as the layer being processed or at a lower layer. Thus, a current layer can be processed using a layer of equal or lower resolution and frequency band. When motion compensation is used for coding, each predicted sub-frame can be obtained from reference frame and current frames at the same or lower layer. After prediction, each of the predicted sub-frames is filtered to remove any frequencies outside the frequency band for that layer. In an alternate embodiment, the full received reference frame can be used for reference. In this situation, the hierarchical data compression method is still useful to limit the drifting process when not all information is received, or to improve the quality of the prediction. It should be noted that several motion compensation techniques may be used with the hierarchical data compression method, including block-based (fixed or variable size), region-based, and multiple reference frames.

Figure 6:
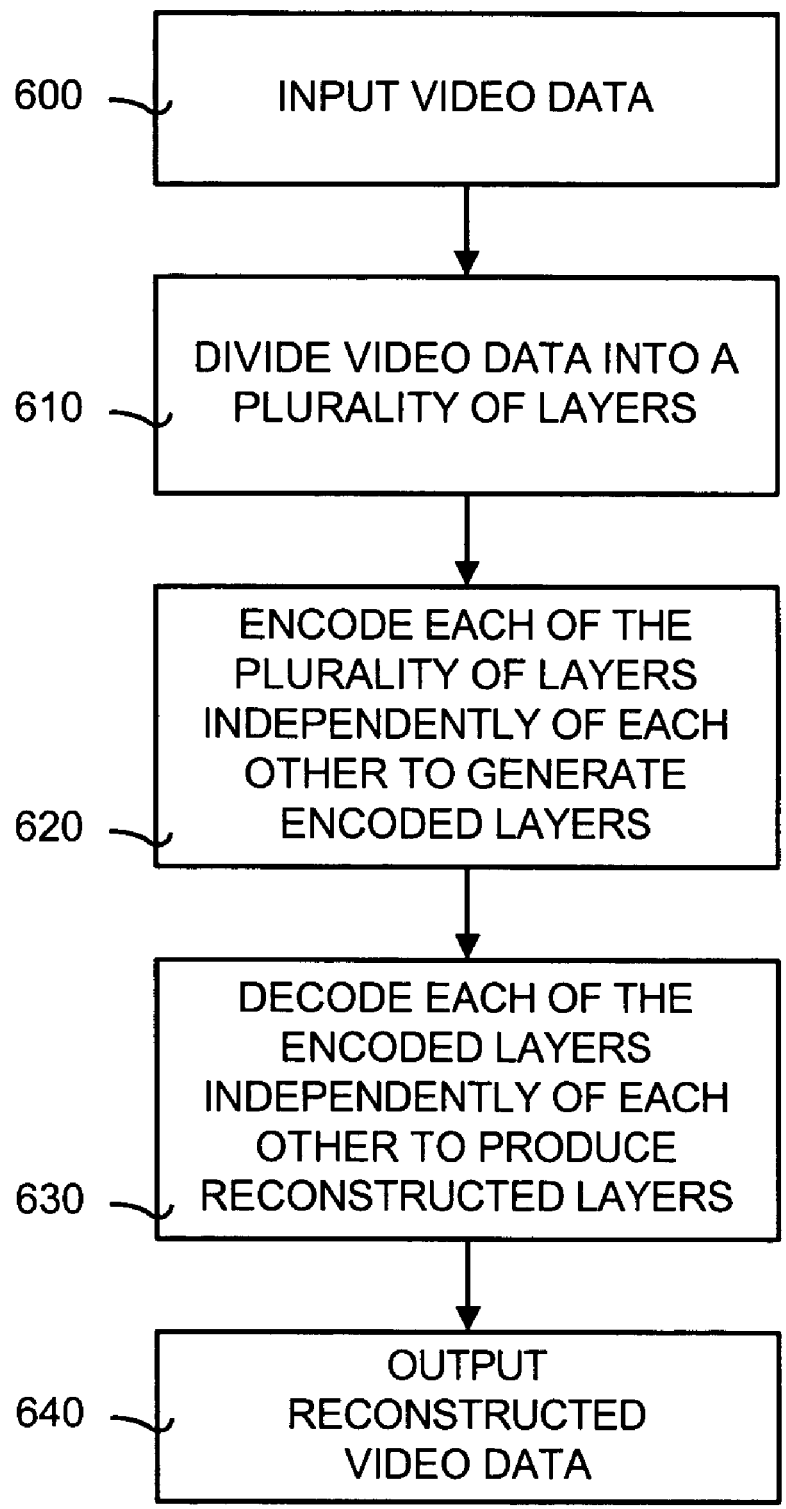
FIG. 6 is a general flow diagram illustrating the operation of the hierarchical data compression method disclosed herein.

FIG. 6 is a general flow diagram illustrating the operation of the hierarchical data compression method disclosed herein. The method begins by inputting video data (box 600). The video data typically contains a plurality of video frames. Next, the video data is divided into a plurality of layers (box 610). As described above, each of these layers contains a unique frequency band and represents a level of resolution.

Each of the plurality of layers is encoded independently of the other layers to generate encoded layers (box 620). These encoded layers are a compressed representation of the video data. Moreover, as described in reference to FIG. 5, the combination of layers represents the full resolution of the video data. The encoded layers then are decoded independently of each other to produce reconstructed layers (box 630). The reconstructed layers are put back together to generate and output reconstructed video data (box 640)

Figure 7:
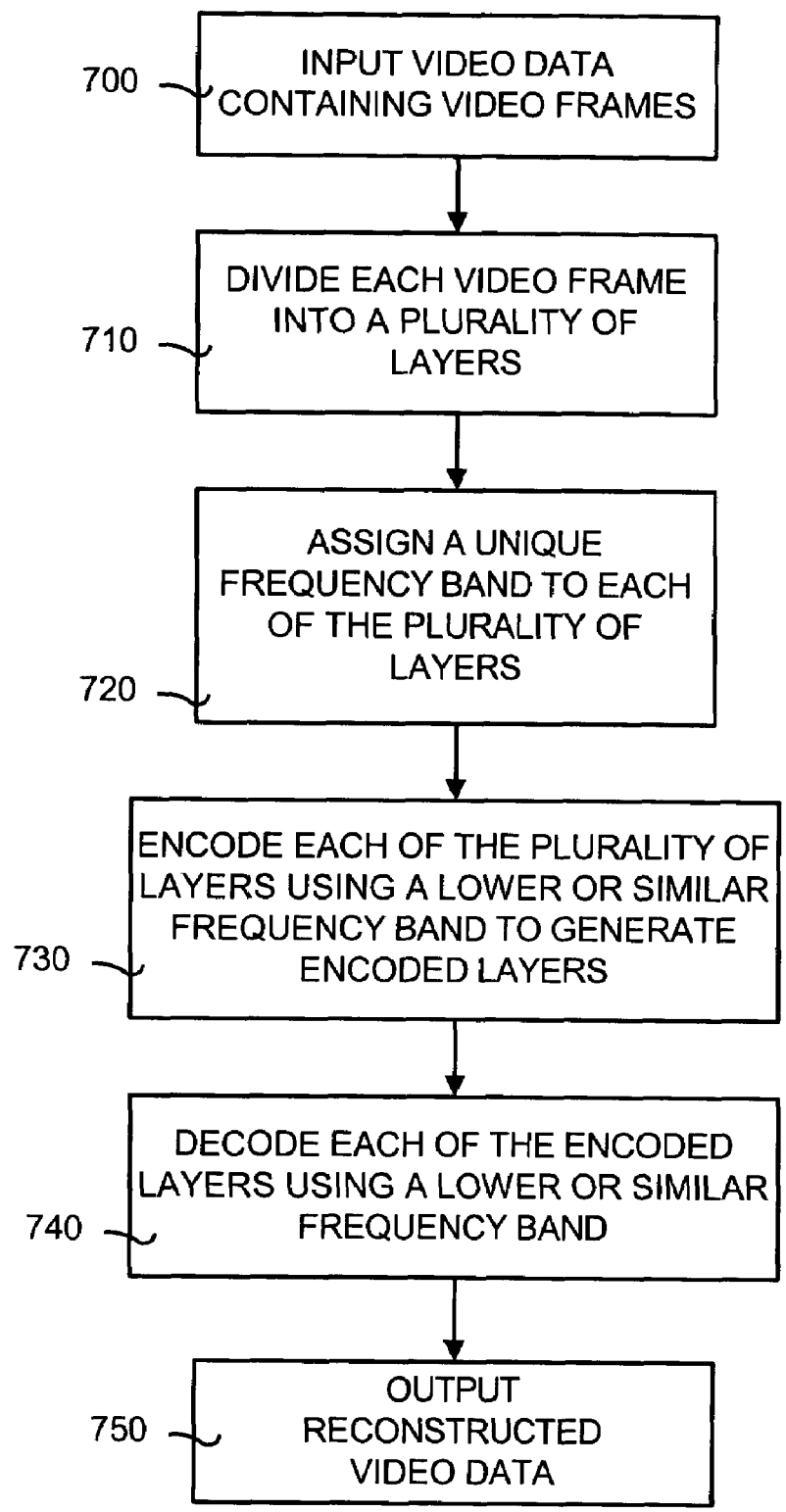
FIG. 7 is an exemplary embodiment of the hierarchical data compression method shown in FIG. 6.

FIG. 7 is an exemplary embodiment of the hierarchical data compression method shown in FIG. 6. The process begins by inputting video data containing video frames (box 700). Each video frame then is divided into a plurality of layers (box 710). As noted above, these layers represent various resolution levels. Next, a unique frequency band is assigned to each of the layers (box 720). The frequency band dictates what type of resolution level a layer will have, with lower frequencies generally providing low resolution and higher frequencies generally providing high resolution. Each of the layers is encoded using a lower or similar frequency band or layer (box 730). This generates separate encoded layers that taken together represent the video frame. At a later time, the encoded layers are decoded using a lower or similar layer or frequency band (box 740). In other words, an encoded layer can be decoded using information from that layer or layers below. Each of the decoded layers is reconstructed to produce a output of reconstructed video data (box 750).

If motion compensation is used to encode and decode the layers, at each of the layer a reference sub-frame for that layer is used to generate a predicted sub-frame at the same layer. Thus, each frequency band or layer is predicted using information at the same or a lower layer. After prediction, the predicted sub-frames are filtered to remove any unwanted frequencies outside of the frequency band. This restricts the frequency band in the predicted sub-frame to the original frequency band in the reference sub-frame for that layer. Ideally, frequency bands are oversampled to reduce spatial aliasing effects. This improves the quality of the predicted sub-frames. Moreover, lower frequency band can be grouped up and used to predict higher frequency bands. This is important to help predicting aliasing components, since filters are not ideal. Using higher bands to predict aliasing into lower bands, however, would break the hierarchical nature of the encoding method, and is not used herein. However, it should be noted that lower frequency bands typically have much higher energy than higher frequency bands, so the aliasing from lower bands into higher bands usually is dominant.

VI. Operational Details and Working Example

Figure 8:
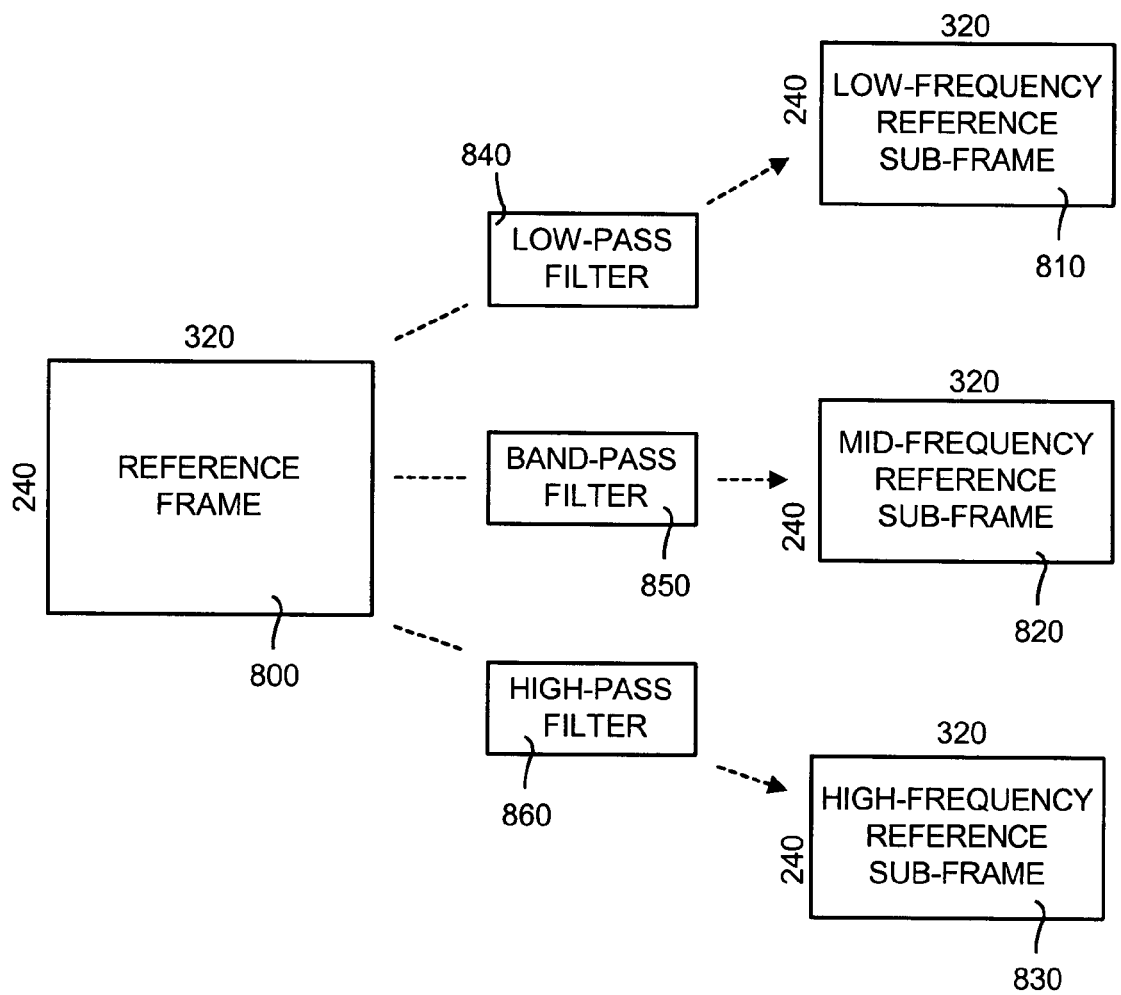
FIG. 8 is a block/flow diagram illustrating an exemplary implementation of the operation of the hierarchical reference frame processing module shown in FIG. 3.

FIG. 8 is a block/flow diagram illustrating an exemplary implementation of the operation of the hierarchical reference frame processing module 305 shown in FIG. 3. In this exemplary implementation, block-based motion compensation is used. Referring to FIG. 8, a reference frame is obtained for use in the hierarchical reference frame processing module 305. In traditional block-based motion compensation, the reference frame 800 is used to produce motion compensation vectors. Instead, the hierarchical reference frame processing module 305 divides the reference frame 800 into several frequency-specific bands. For example, in the exemplary implementation shown in FIG. 8, the reference frame 800 is divided into a low frequency sub-frame 810, a mid frequency sub-frame 820, and a high frequency sub-frame 830. It should be noted that in other implementations the reference frame 800 may be divided into a greater or lesser number of sub-frames.

The hierarchical reference frame processing module 305 divides the reference frame 800 into sub-frames using filters. In particular, as shown in FIG. 8, the low frequency sub-frame 810 is generated by applying a low-pass filter 840 to the reference frame 800. Similarly the mid frequency sub-frame 820 is generate using a band-pass filter 850 and the high frequency sub-frame 830 is generated using a high-pass filter 860.

For improved performance, the hierarchical reference frame processing module 305 may preserve the size of the reference frame during division. In other words, each of the sub-frames 810, 820, 830 generally are the same size as the reference frame 800. As shown in FIG. 8, in this exemplary implementation, the reference frame 800 has a size of 240× 320 pixels. After division of the reference frame 800 by the hierarchical reference frame processing module 305, each of the resultant sub-frames 810, 820, 830 also has a size of approximately 240×320 pixels.

Figure 9:
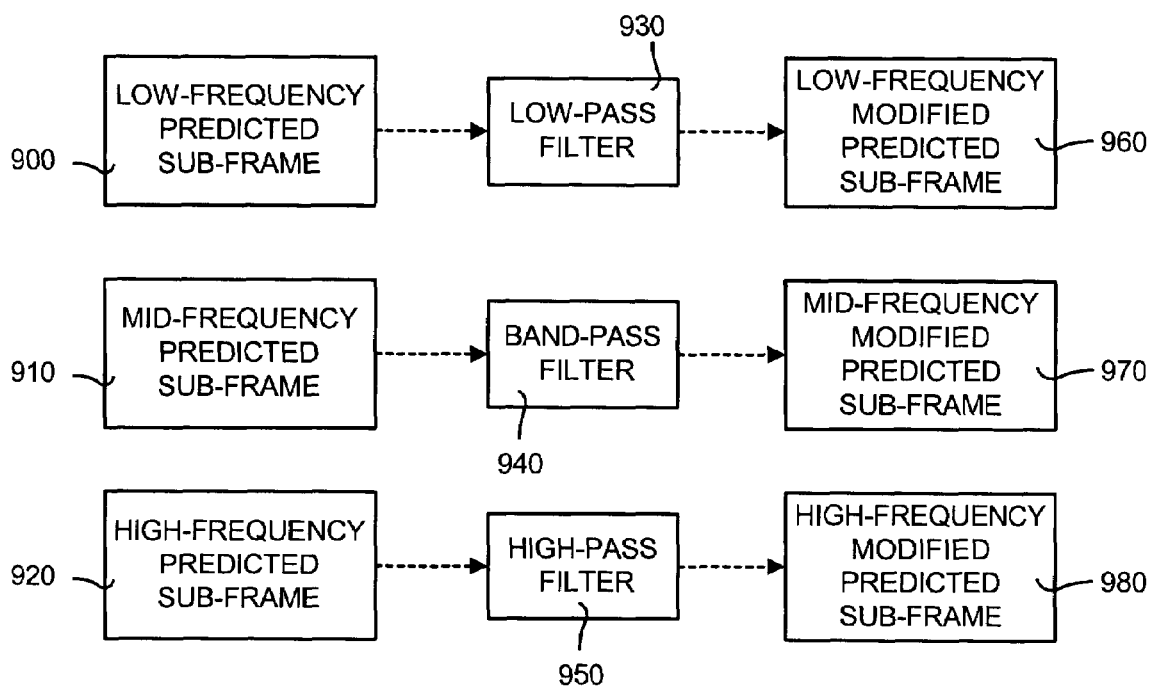
FIG. 9 is a block/flow diagram illustrating an exemplary implementation of the operation of the hierarchical prediction frame processing module shown in FIG. 3.

FIG. 9 is a block/flow diagram illustrating an exemplary implementation of the operation of the hierarchical prediction frame processing module 315 shown in FIG. 3. In traditional block-based motion compensation approaches, a single predicted frame is created dividing chopping the reference frame 800 into blocks and matching blocks in the reference frame 800 to a current frame. The blocks of the predicted frame are essentially "glued" together. Unlike traditional block-based motion compensation approaches, the hierarchical prediction frame processing module 315 produce a plurality of predicted sub-frames from the reference sub-frames 810, 820, 830. In particular, in the as shown in FIG. 9, the low frequency reference sub-frame 810 is used to produce a low frequency predicted sub-frame 900, the mid frequency reference sub-frame 820 is used to produce a mid frequency predicted sub-frame 910, and the high frequency reference sub-frame 830 is used to generate a high frequency predicted sub-frame 920. Note that each of these sub-frames can be produced by using any one of the methods used to produce the predicted frame in traditional motion compensation (such as, block based, region based, variable block size, and so forth). The only difference is that each sub-frame is based only on a corresponding reference sub-frame (as opposed to being based on the complete reference frame).

During the production of the predicted sub-frames 900, 910, 920 from the reference sub-frames 810, 820, 830, many unwanted frequencies may be added. For example, high frequencies from caused by discontinuities between the blocks may appear in the low-frequency predicted frame 900. Because the low-frequency reference sub-frame contains only low frequencies, the predicted frame 900 should also contain only low frequencies. It is readily apparent that high frequencies do not belong and that these are unwanted high-frequencies added during the motion compensation process. Thus, each high frequency in the low-frequency predicted frame 900 must be a blocking artifact.

In order to eliminate these blocking artifacts, the hierarchical prediction frame processing module 315 performs further filtering of each of the predicted sub-frames 900, 910, 920. In particular, a low-pass filter 930 is applied to the low frequency predicted sub-frame 900, a band-pass filter 940 is applied to the mid frequency predicted sub-frame 910, and a high-pass filter 950 is applied to the high frequency predicted sub-frame 920. This filtering process produces a low frequency modified predicted sub-frame 960, a mid frequency modified predicted sub-frame 970, and a high frequency modified predicted sub-frame 980 from each of the respective predicted sub-frames 900, 910, 920. Any high frequencies added by the motion compensation process to the low frequency predicted sub-frame 900 is removed by the low-pass filter 930 and will not show up in the modified low frequency predicted sub-frame 960. Similarly, in the high frequency predicted sub-frame 920, any low frequencies added by the aliasing effect on the block boundaries will be removed by the high-pass filter 950. If desired, an "overall" predicted frame could be obtained by properly adding the sub-frames 960, 970, and 980.

Two important things should be noted. First, the modified predicted sub-frames 960, 970, 980 are a better prediction of the current frame than the predicted sub-frames 900, 910, 920 or traditional predicted frames. Second, the modified predicted sub-frames 960, 970, 980 are hierarchical by nature. Each of these could (after having the appropriate residue added) be used as the next reference frame, without ever making any use of the other layers. With current motion compensation techniques, the full reference frame is needed to produce a predicted frame. The hierarchical nature of the modified predicted sub-frames enables hierarchical coding.

In order to more fully understand the hierarchical data compression system and method disclosed herein, the operational details of an exemplary working example are presented. It should be noted that this working example is only one way in which the hierarchical data compression system and method may be implemented.

Figure 10:
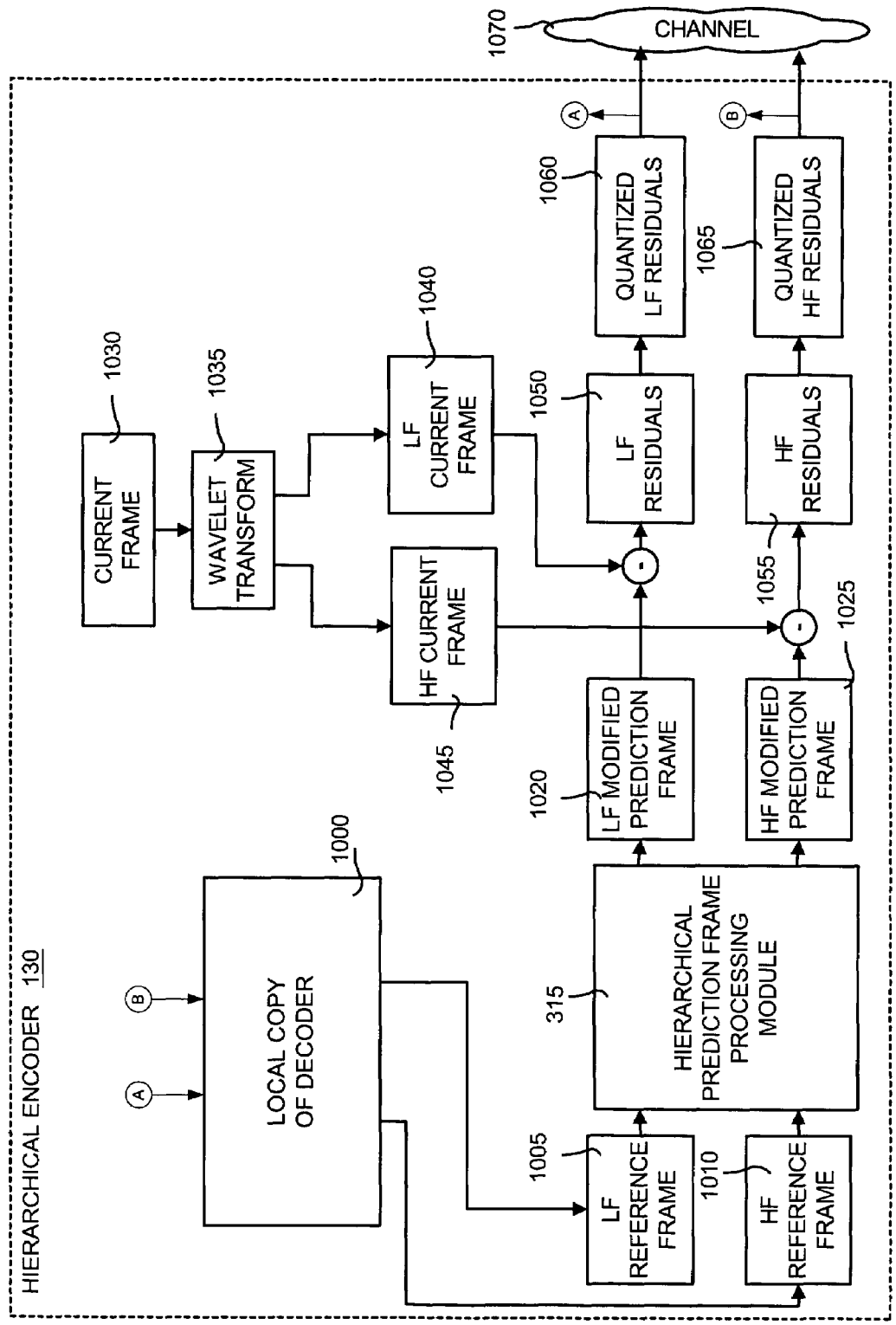
FIG. 10 is a detailed block diagram illustrating a working example of the hierarchical encoder of the hierarchical data compression system shown in FIG. 1 and is presented for illustrative purposes only.

FIG. 10 is a detailed block diagram illustrating a working example of the hierarchical encoder 130 of the hierarchical data compression system 100 and is presented for illustrative purposes only. The hierarchical encoder contains a local copy of the decoder 1000, which reproduces all steps of the decoder. The decoder is described below with reference to FIG. 11. This local copy of the decoder 1000 takes as input the same bits send to the decoder (shown in FIG. 10 as "A" and "B"), and produces a low-frequency reference frame 1005 and a high-frequency reference frame 1010, in the same way as to be described below for the decoder.

The hierarchical encoder 130 obtains the reference frames 1005, 1010 in the spatial domain and performs an oversampled wavelet transform on the reference frames 1005, 1010. The oversampled wavelet transform transforms the reference frames 1005, 1010 from the spatial domain into a wavelet or frequency domain. Wavelet transformation is well known in the art, and one example of a discrete wavelet transformation is Daubechies 9/7 filters. As common in the art, the wavelet may be applied in both horizontal and vertical directions, producing four bands, LL, HL, LH, and HH. More elaborate schemes, including frames, hierarchical, directional, or other techniques could also be used. In this working example, an oversampled wavelet was used. It should be noted that to simplify the drawings, this working example is described where only one level and direction of wavelet is applied (say to the horizontal direction), generating two bands, L and H. A person skilled in the art, however, will immediately know how to extend this to 4 bands (HH, HL, LH, and HH), or other more complex wavelet schemes.

The resultant wavelet-transformed reference frame was divided into two layers, namely, the low frequency reference frame 1005 containing only the L band, and the high frequency reference frame 1010, containing only the H band. A low-pass filter (not shown) was used to obtain the low frequency reference frame 1005, which contained only low frequencies. A high-pass filter (not shown) was used to obtain the high frequency reference frame 1010, which contained only high frequencies. This filters can be simply the corresponding inverse wavelet transform filters. More precisely, one could simply feed an (overcomplete) inverse wavelet transform with only the L band (in other words, the H band is set to zero) to obtain one of the sub-frames (the low frequency sub-frame), and another with only the H band, to obtain the other sub-frame (the high frequency sub-frame). It should be noted that this produces two sub-frames that are back in the pixel domain, but each contain only (complementary) parts of the frequency spectrum. Moreover, note that if a "perfect" reconstruction filter is used, an original reference frame can be obtained by simply adding these two sub-frames.

Both the low frequency reference frame 1005 and the high frequency reference frame 1010 then are processed by the hierarchical prediction frame processing module 315. Details of the hierarchical prediction frame processing module 315 used in this working example are given below. The hierarchical prediction frame processing module 315 processes the low frequency reference frame 1005 to produce a low frequency modified prediction frame 1020. Similarly, the high frequency reference frame 1010 is processed by the hierarchical prediction frame processing module 315 to produce a high frequency prediction frame 1025. Theses prediction frames 1020, 1025 can be in the pixel or frequency (wavelet) domain. In this working example, the sub-frames 1020 and 1025 are produced in the (critically sampled) wavelet domain.

Meanwhile, a current frame 1030 is obtained from video data. The current frame 1030 is in the spatial domain, and a wavelet transform 1035 is applied to the current frame 1030 to obtain two current sub-frames in the (critically sampled) wavelet domain. Namely, a low-frequency current sub-frame 1040 and a high-frequency current sub-frame 1045. As stated above, wavelet transformation is well known in the art, and one example of a discrete wavelet transformation is Daubechies 9/7 filters. As is known in the art, the wavelet may be applied in both horizontal and vertical directions, producing four bands, LL, HL, LH, and HH. More elaborate schemes, including frames, hierarchical, directional, or other techniques could also be used. Once again, for simplicity the working example is described and shown for the case where only one level and direction of wavelet is applied (say to the horizontal direction), generating two bands, L and H. A person skilled in the art, however, will immediately know how to extend this to 4 bands (HH, HL, LH, and HH), or other more complex wavelet schemes. The resultant wavelet-transformed current frame is divided into two layers, namely, the low frequency current frame 1040 containing only the L band, and the high frequency current frame 1045, containing only the H band.

A difference of the prediction frames and the current frames for each layer then is obtained. In particular, the low frequency modified prediction frame 1020 is subtracted from the low frequency current frame 1040 to obtain low frequency residuals 1050. Likewise, the high frequency modified prediction frame 1025 is subtracted from the high frequency current frame 1045 to produce high frequency residuals 1055. The low frequency residuals 1050 are quantized to produce quantized low frequency residuals 1060 and the high frequency residuals 1055 are quantized to produce quantized high frequency residuals 1065. The quantized residuals 1060, 1065 then are encoded and transmitted over a variable bit-rate channel 1070. Several methods can be used for encoding these coefficients. A person skilled in the art will be familiar with several methods, including zero-trees, zig-zag scans, arithmetic coding, run-length and others. Similarly other side information (such as motion vectors, quantization steps, and so forth) are being sent along with the quantized residuals 1060, 1065.

Figure 11:
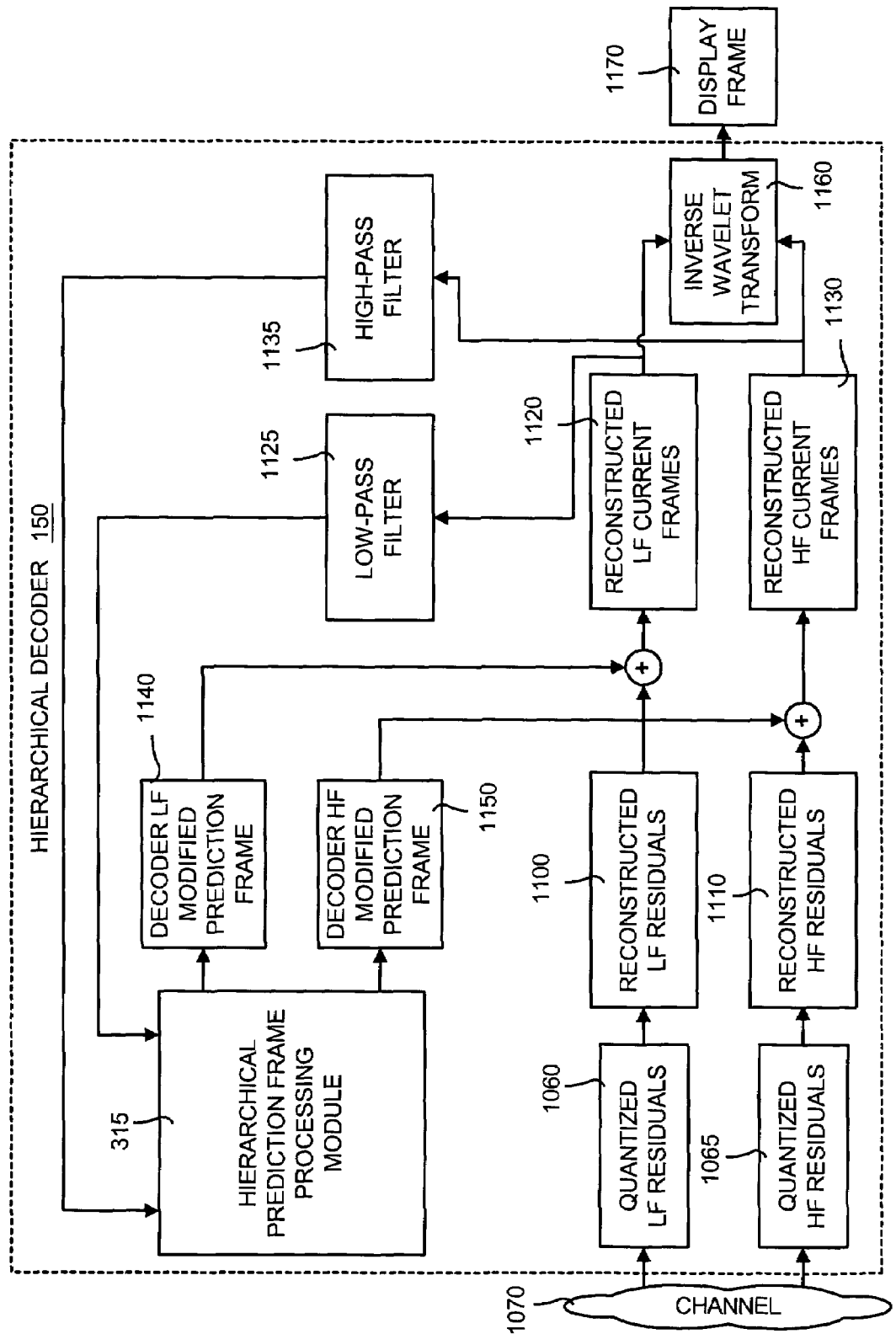
FIG. 11 is a detailed block diagram illustrating a working example of the hierarchical decoder of the hierarchical data compression system shown in FIG. 1 and is presented for illustrative purposes only.

FIG. 11 is a detailed block diagram illustrating a working example of the hierarchical decoder 150 of the hierarchical data compression system 100 and is presented for illustrative purposes only. The hierarchical decoder 150 receives the quantized residuals 1060, 1065 that are transmitted over the variable bit-rate channel 1070. The quantized low frequency residuals 1060 are inverse quantized to produce reconstructed low frequency residuals 1100 and the high frequency quantized residuals 1065 are inverse quantized to produce reconstructed high frequency residuals 1110.

Reference frame(s) are input into the hierarchical prediction frame processing module 315. This processing is performed exactly as the one in the hierarchical encoder 130. In the hierarchical decoder 150, the reference frames are reconstructed current frames from a previous video frame. In particular, a reconstructed low frequency current frame 1120 (from a previous video frame) is filtered by a low-pass filter 1125 to produce a low-frequency reference sub-frame (not shown), and a reconstructed high frequency current frame 1130 (from a previous video frame) is filtered by a high-pass filter 1135 to produce a high-frequency sub-frame (not shown). Both sub-frames then are input to the hierarchical prediction frame processing module 315. After processing by the module 315 (which is discussed below), the output of the module 315 is a decoder low frequency modified prediction frame 1140 for the low frequency layer and a decoder high frequency modified prediction frame 1150 for the high frequency layer. Except as for bit errors in the channel, these should be the same as those prediction frames produced in the encoder, namely 1020 and 1025 shown in FIG. 10.

For the low frequency layer, the reconstructed low frequency residuals 1100 and the decoder low frequency modified prediction frame 1140 are summed to produce the reconstructed low frequency current frame 1120 (for the current video frame). Likewise, the reconstructed high frequency residuals 1110 and the decoder high frequency modified prediction frame 1150 are summed to produce the reconstructed high frequency current frame 1130 (for the current video frame). The reconstructed current frames 1120, 1130 may serve as the input reference frames for the hierarchical prediction frame processing module 315 for a subsequent video frame. Moreover, the reconstructed current frames 1120, 1130 are in the wavelet domain, and are processed by an inverse wavelet transform 1160 to transform the reconstructed current frames 1120, 1130 from the wavelet domain to the spatial domain. This produces inverse reconstructed current frames in the spatial domain that are put together to generate a display frame 1170.

Figure 12:
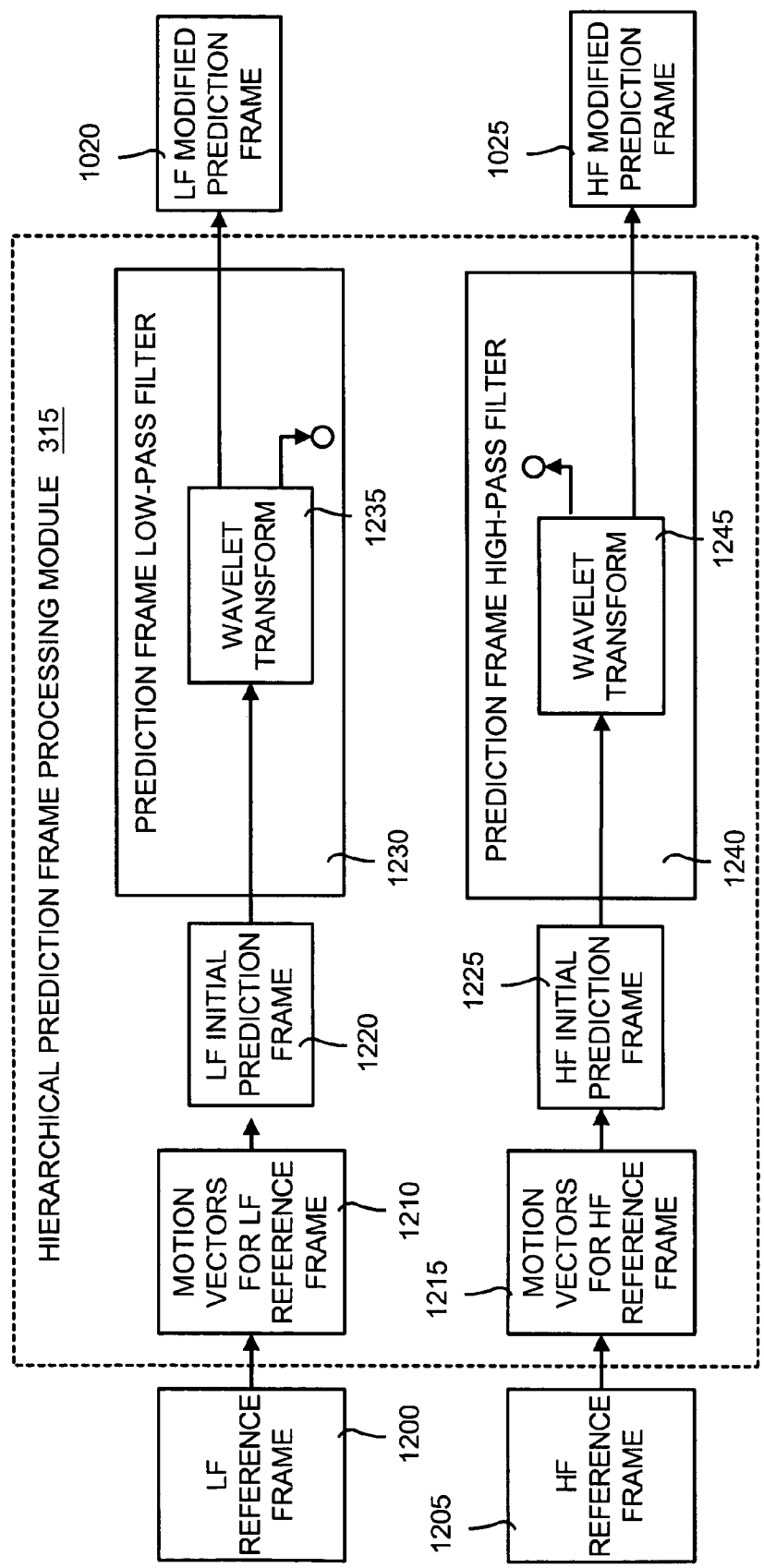
FIG. 12 is a detailed block diagram illustrating an exemplary implementation of the hierarchical prediction frame processing module used in the working example of FIGS. 10 and 11.

As shown in FIGS. 10 and 11, the hierarchical prediction frame processing module 315 is contained in both the hierarchical encoder 130 and the hierarchical decoder 150. FIG. 12 is a detailed block diagram illustrating an exemplary implementation of the hierarchical prediction frame processing module 315 used in the working example of FIGS. 10 and 11. In FIG. 12, the hierarchical prediction frame processing module 315 is shown as it was used in the hierarchical encoder 130. It should be noted, however, that the hierarchical prediction frame processing module 315 as used in the hierarchical decoder 150 operates in a similar manner.

As shown in FIG. 12, in this working example the hierarchical prediction frame processing module 315 inputs two bands or layers of reference frames. Similar to the hierarchical encoder 130 and the hierarchical decoder 150, the hierarchical prediction frame processing module 315 processes the references frames band-by-band or layer-by-layer. In particular, the hierarchical prediction frame processing module 315 inputs a low frequency reference frame 1200 for the low frequency band and a high frequency reference frame 1205 for the high frequency band. Both of the reference frames 1200, 1205 are in the pixel domain.

Motion vectors from the reference frames 1200, 1205 of both bands are obtained. In particular, motion vectors for the low frequency reference frame 1210 and motion vectors from the high frequency reference frame 1215 are used to generate a low frequency initial prediction frame 1220 and a high frequency initial prediction frame 1225. Standard block-based motion compensation is used in each of the sub-frames. The hierarchical prediction frame processing module 315 includes frequency filters that ensure that any unwanted frequencies that may have been added to an initial prediction frame 1220, 1225 during processing are eliminated. These unwanted frequencies include frequencies that are outside of the frequency band for a particular layer. For example, high frequencies added during processing to the low frequency initial prediction frame 1220 will show up as blocking artifacts. By passing the low frequency initial prediction frame 1220 through a low-pass filter, these blocking artifacts (in the form of high frequencies) are eliminated and a higher-quality prediction frame is produced.

In this working example, the low band or layer includes a low pass filter 1230. The low pass filter 1230 is used to filter out any unwanted high frequencies outside of the low frequency band layer. A low frequency signal from the low frequency initial prediction frame 1220 is processed by a (critically sampled) wavelet transform 1235 to produce the low frequency modified prediction frame 1020. Note that in this working example, the prediction frame is in the wavelet domain. The high frequency coefficients of the wavelet transform 1235 are discarded in this working example. In other embodiments, however, the high frequency coefficients may passed onto the higher layer and be used to help predict the high frequency wavelet coefficients.

The hierarchical prediction frame processing module 315 also includes a high pass filter 1240 for processing the high band or layer. The high pass filter 1240 is used to filter out any unwanted low frequencies outside of the high frequency band layer. A high frequency signal from the high frequency initial prediction frame 1225 is processed by a wavelet transform 1245 to produce the high frequency modified prediction frame 1025 in the wavelet domain. The low-frequency wavelet coefficients generated in the wavelet transform 1245 are discarded.

A person skilled in the art will immediately identify several modifications that will preserve the basic principle of operating in independent frequency bands. In particular, the prediction may be processed directly in the wavelet domain, instead of the pixel domain (as in this working example). Alternatively, the prediction frame can be produced in the pixel domain.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for coding video data, comprising:
   using a general-purpose computing device to perform the following process actions:
   dividing the video data into a plurality of layers;
   encoding each of the plurality of layers independently of each other to produce an encoded version of the video data, encoding further comprising:
   dividing a reference frame of the video data into a plurality of layers containing reference sub-frames using a hierarchical reference frame processing module, wherein each of the reference sub-frames contains a unique frequency band;

generating predicted frames using a hierarchical predicting frame processing module, each of the predicted frames containing a unique frequency band for each of the plurality layers using the corresponding reference sub-frame containing the unique frequency band to generate predicted sub-frames;

filtering each of the predicted sub-frames using the hierarchical predicting frame processing module based on the unique frequency band of that predicted sub-frame such that frequencies outside of the unique frequency band are eliminated to generate modified predicted sub-frames at each of the plurality of layers; and decoding each of the plurality of layers independently of each other to produce a reconstructed version of the video data.

2. The method as set forth in claim 1, further comprising assigning a frequency band to each of the plurality of layers such that each layer contains a unique range of frequencies.

3. The method as set forth in claim 2, wherein encoding and decoding is performed using a motion compensation technique.

4. A computer-implemented process for coding video data having video frames, comprising:

using the computer to perform the following process actions:

dividing each of the video frames into a plurality of layers using a hierarchical reference frame processing module;

assigning a frequency band representing different resolution levels to each of the plurality of layers such that each layer contains a specific frequency band; and encoding and decoding each of the plurality of layers independent of each other, encoding further comprising:

using a hierarchical predicting frame processing module and a motion compensation technique to generate predicted frames that contain respective predicted sub-frames at each of the plurality of layers; and filtering each of the predicted sub-frames using the hierarchical predicting frame processing module based on a unique frequency band of each of the predicted sub-frame such that frequencies outside of the unique frequency band are eliminated to generate modified predicted sub-frames at each of the plurality of layers.

5. The computer-implemented process as set forth in claim 4, wherein dividing further comprises creating a low frequency layer containing low frequencies, a mid frequency layer containing mid-range frequencies, and a high frequency layer containing high frequencies.

6. The computer-implemented process as set forth in claim 4, wherein the motion compensation technique includes reference frames and current frames.

7. The computer-implemented process as set forth in claim 6, wherein each of the reference frames and current frames contain respective sub-frames at each of the plurality of layers.

8. The computer-implemented process as set forth in claim 7, further comprising generating the predicted sub-frames from corresponding reference sub-frames at a same layer and containing a same frequency band.

9. The computer-implemented process as set forth in claim 7, further comprising predicting the predicted sub-frames from corresponding reference sub-frames at a same layer and containing a same frequency band and from reference sub-frames at a lower layer and containing lower frequency bands.

10. The computer-implemented process as set forth in claim 4, further comprising oversampling the frequency band to eliminate spatial aliasing effects.

11. A method for coding video data containing video frames, comprising:

using a general-purpose computing device to perform the following process actions:

dividing each of the video frames into a plurality of layers using a hierarchical reference frame processing module;

assigning a unique frequency band to each of the plurality of layers, whereby the frequency band corresponds to resolution levels such that a lower frequency band has a lower resolution and a higher frequency band has a higher resolution;

encoding each of the plurality of layers using a lower or similar frequency band to generated encoded layers representing the video data, the encoding further comprising:

producing a prediction frame using a hierarchical predicting frame processing module for each of the plurality of layers from a reference frame containing a lower or similar frequency band;

filtering the prediction frames using the hierarchical predicting frame processing module and for each of the plurality of layers to eliminate any frequencies outside of a corresponding frequency band for that layer; and decoding each of the encoded layers using a lower or similar frequency band to produce reconstructed video data.

12. A computer-implemented process for decoding video data encoded in layers, where each of the layers represents a different resolution level of the video data, comprising:

using the computer to perform the following process actions:

reconstructing a residual sub-frame containing a frequency band having a unique range of frequencies;

generating a reference sub-frame that contains the frequency band using a hierarchical reference frame processing module;

generating a predicted sub-frame from the reference sub-frame using a hierarchical predicting frame processing, wherein the predicted sub-frame and corresponding reference sub-frame contain the same frequency band; and filtering the predicted sub-frames using the hierarchical predicting frame processing module to remove frequencies outside of the frequency band to generate a modified predicted sub-frame.

13. The computer-implemented process of claim 12, wherein the frequency band is a portion of all frequencies contained in the video data.

14. The computer-implemented process of claim 12, wherein the frequency band represents a resolution level of the video data.

15. The computer-implemented process of claim 12, further comprising reconstructing a current sub-frame using the modified predicted sub-frame, wherein the current sub-frame contains the frequency band.

16. A hierarchical data compression system, comprising:

a hierarchical encoder that encodes video data into a plurality of layers, wherein each of the plurality of layers contains a unique frequency band, the hierarchical encoder further comprising:

a hierarchical prediction frame processing module that generates predicted sub-frames, wherein each predicted sub-frame corresponds to the plurality of layers and contains a unique frequency band;

filters that filter the predicted sub-frames to remove frequencies outside a frequency band for each particular predicted sub-frame to generate modified predicted sub-frames;
an encoded bitstream containing a plurality of encoded layers; and
a hierarchical decoder that decodes each of plurality of encoded layers independently of other layers.

17. The hierarchical data compression system as set forth in claim 16, wherein the hierarchical encoder further comprises a hierarchical reference frame processing module that produces reference sub-frames, wherein each reference sub-frame corresponds to the plurality of layers and contains a unique frequency band.

* * * * *